Dec. 21, 1926.
A. L. RODGERS
VALVE GEAR
Filed June 19, 1926
1,611,236
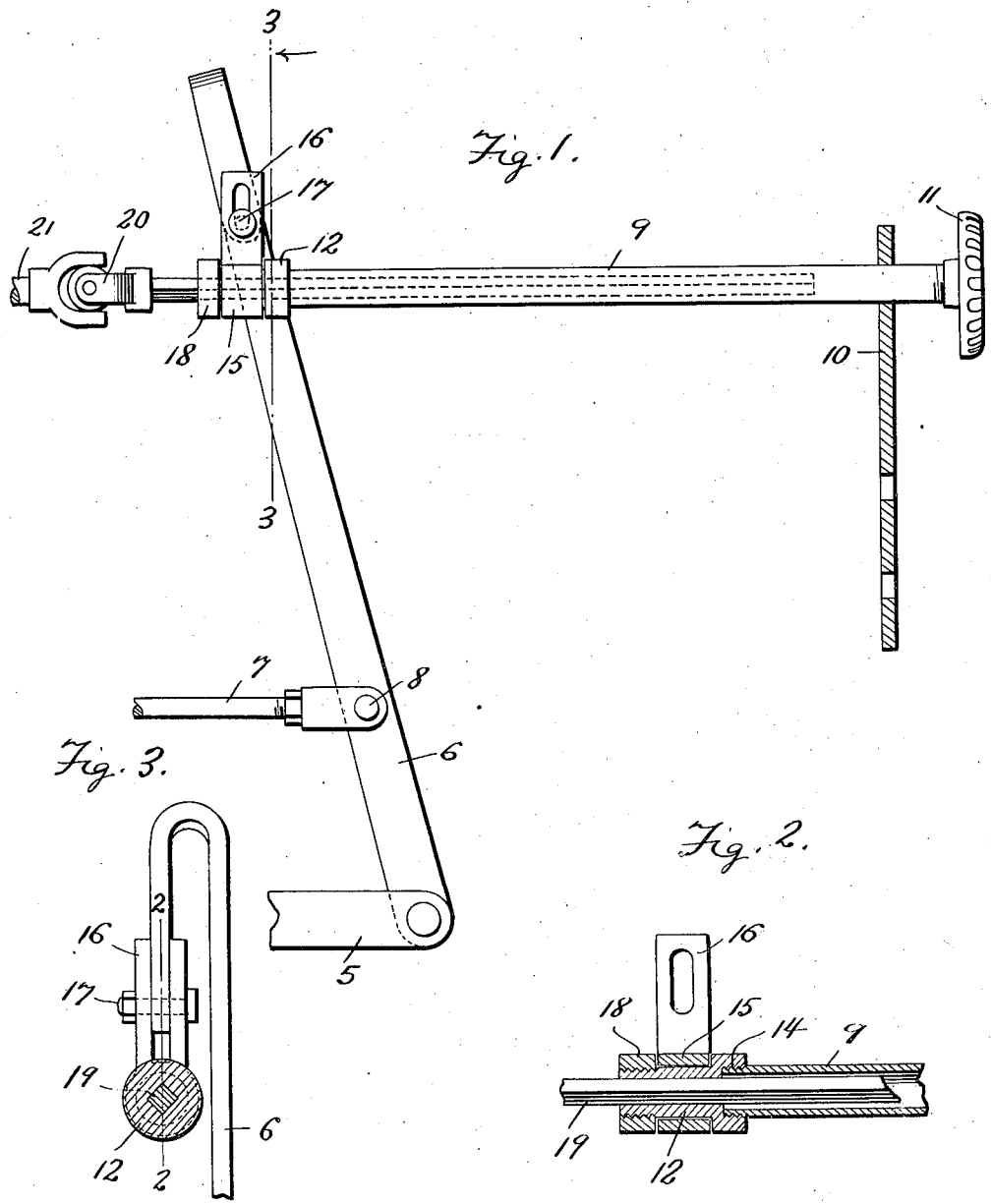
Inventor
A. L. Rodgers
By Clarence A. O'Brien
Attorney Patented Dec. 21, 1926.

1,611,236

UNITED STATES PATENT OFFICE.

ARTHUR L. RODGERS, OF WEWOKA, OKLAHOMA.

VALVE GEAR.

Application filed June 19, 1926. Serial No. 117,206.

The present invention relates to a valve gear and has for its prime object to provide a structure whereby an engineer may conveniently operate the throttle valve and the reversing valve from a common point.

Another very important object of the invention lies in the provision of a valve gear of this nature which is exceedingly compact in its construction, efficient and reliable in its operation, easy to manipulate, strong and durable, inexpensive to manufacture, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is an elevation of the contrivance embodying the features of my invention, Fig. 2 is a detail section taken substantially on the line 2—2 of Fig. 3, and Fig. 3 is a detail section taken substantially on the line 3—3 of Fig. 1.

Referring to the drawing in detail, it will be seen that 5 denotes a link support on which is pivoted a lever 6. The reverse valve operating rod 7 is pivotally engaged with an intermediate portion of the lever 6 as at 8. The upper end of the lever is bent over downwardly upon itself as is clearly shown in Fig. 3. A tubular member 9 is slidable and rotatable through an opening in a plate 10 and on the outer end thereof has threaded thereon an operating knob 11. A sleeve 12 is threaded on the inner end of the tubular member 9 as at 14 and receives the collar 15 of a pair of slotted upstanding ears 16, which receive therebetween the upper extremity of the lever 6, a bolt 17 piercing the slots of the ears 16 and the free extremity of the lever 6.

A nut 18 is threaded on the sleeve 12 for preventing the displacement of the collar 15. A squared shaft 19 is slidable through a square bore provided in the sleeve 12 and extends into the tubular member 9. A universal joint 20 is coupled with the squared shaft 19 and is also engaged with the throttle valve operating rod 21. It will therefore be seen that to operate the throttle valve, it is only necessary to turn the knob 11, thereby turning the tubular member 9, the sleeve 12 and the rod 19. To shift the reversing valve, it is only necessary to pull or push on the knob 11 as the case may be, for swinging the lever 6, thereby causing the sleeve 12 to slide on the rod 19.

It is thought that this device is exceedingly simple in its construction, compact, thoroughly reliable and efficient in operation, easy to manipulate, and of a very inexpensive construction.

The present embodiment of the invention has been disclosed in detail merely by way of example, since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:—

1. A valve gear of the class described including, in combination, a lever, a reverse valve operating means engaged with an intermediate portion of the lever, the upper end of the lever being bent downwardly, a sleeve having a squared bore, a pin and slot connection between the sleeve and the upper end of the lever, a tube engaged with the sleeve, means for slidably and rotatably mounting the tube, a squared shaft slidable through the squared bore of the sleeve and into the tubular member, a universal joint on the squared shaft, and a throttle valve operating means associated with the universal joint.

2. A valve gear of the class described including, in combination, a lever, means for pivotally mounting the lever, the upper end of the lever being bent downwardly over upon itself, the first operating rod engaged with an intermediate portion of the lever, a sleeve having a squared bore, a pair of ears rising from the sleeve and provided with slots, a bolt extending through the upper extremity of the lever and the slots, a tube engaged with the sleeve, means for slidably and rotatably supporting the tube, a squared shaft slidable through the squared bore of the sleeve, a universal joint on the squared shaft, and a throttle valve operating means engaged with the universal joint.

In testimony whereof I affix my signature.

ARTHUR L. RODGERS.